(12) United States Patent
Wang et al.

(10) Patent No.: US 8,631,783 B2
(45) Date of Patent: Jan. 21, 2014

(54) METHOD AND APPARATUS FOR CONTROLLING ENGINE TORQUE DURING INTRUSIVE TESTING

(75) Inventors: Lan Wang, Troy, MI (US); Zhong Wang, Bellevue, WA (US); Christopher E. Whitney, Highland, MI (US); Jinchun Peng, Canton, MI (US); Ian J. Mac Ewen, White Lake, MI (US)

(73) Assignee: GM Global Technology Operations LLC

( * ) Notice: Subject to any disclaimer, the term of this patent is extended or adjusted under 35 U.S.C. 154(b) by 1057 days.

(21) Appl. No.: 12/620,848

(22) Filed: Nov. 18, 2009

(65) Prior Publication Data

US 2011/0114062 A1    May 19, 2011

(51) Int. Cl.
*F02P 5/00* (2006.01)
*F02M 7/00* (2006.01)
*F02M 33/02* (2006.01)

(52) U.S. Cl.
USPC ..................... 123/406.24; 123/520

(58) Field of Classification Search
USPC .................. 123/520, 406.13, 406.23, 406.24, 123/406.44; 73/114.01, 114.77
See application file for complete search history.

(56) References Cited

U.S. PATENT DOCUMENTS

| | | | | |
|---|---|---|---|---|
| 5,669,362 A | * | 9/1997 | Shinohara et al. | 123/520 |
| 6,560,527 B1 | * | 5/2003 | Russell et al. | 701/110 |
| 6,935,306 B2 | * | 8/2005 | Surnilla et al. | 123/339.11 |
| 2004/0144360 A1 | * | 7/2004 | Surnilla et al. | 123/339.11 |
| 2006/0000441 A1 | * | 1/2006 | Russell et al. | 123/305 |
| 2006/0081231 A1 | * | 4/2006 | White | 123/436 |

\* cited by examiner

*Primary Examiner* — Stephen K Cronin
*Assistant Examiner* — Arnold Castro

(57) ABSTRACT

A control system and method for controlling an engine includes a control module. The control module includes an evaporation control valve module closing a canister purge valve during a system diagnostic. A torque determination module determines a torque change for an end of the system diagnostic. A torque adjustment module changes an engine torque to a changed torque corresponding to the torque change. The evaporation control valve module opens the purge valve at the end of the diagnostic.

21 Claims, 4 Drawing Sheets

METHOD AND APPARATUS FOR CONTROLLING ENGINE TORQUE DURING INTRUSIVE TESTING

FIELD

The present disclosure relates to vehicle control systems and more particularly to vehicle control systems for controlling torque in an engine during intrusive testing.

BACKGROUND

This section provides background information related to the present disclosure which is not necessarily prior art. The background information provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powertrain that includes a powerplant (e.g., an engine, an electric motor, and/or a combination thereof), a multispeed transmission, and a differential or final drive train. The powerplant may include an engine that produces drive torque that is transmitted through one of various gear ratios of the transmission to the final drive train to drive wheels of the vehicle. The engine may produce drive torque by combusting an air-fuel mixture in cylinders of the engine. The air-fuel mixture may be controlled by one or more electronic control modules.

Some system diagnostics are performed on the vehicle while the vehicle is operating. Because the vehicle is operating, the system diagnostics may be intrusive. One type of system diagnostic is a fuel adjustment system diagnostic (FASD). The FASD is effective at diagnosing many fuel delivery, air delivery and some exhaust system malfunctions. Because portions of the FASD test are intrusive, drivability issues caused by air/fuel delivery disturbances, particularly at idle or low speed conditions, are evident to the vehicle operators.

SUMMARY

The present disclosure provides a system and method for reducing the drivability impact of an intrusive system diagnostic on a vehicle.

In one aspect of the disclosure, a method of controlling an engine includes closing a canister purge valve, performing a system diagnostic, determining a torque change, changing an engine torque to a changed torque corresponding to the torque change, and opening the purge valve.

In a further aspect of the disclosure, a control system for controlling an engine includes a control module. The control module includes an evaporation control valve module closing a canister purge valve during a system diagnostic. A torque determination module determines a torque change for an end of the system diagnostic. A torque adjustment module changes an engine torque to an increased torque corresponding to the torque loss. The evaporation control valve module opens the purge valve at an end of the diagnostic.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the disclosure, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term boost refers to an amount of compressed air introduced into an engine by a supplemental forced induction system such as a turbocharger. The term timing refers generally to the point at which fuel is introduced into a cylinder of an engine (fuel injection) is initiated.

Figure 1:
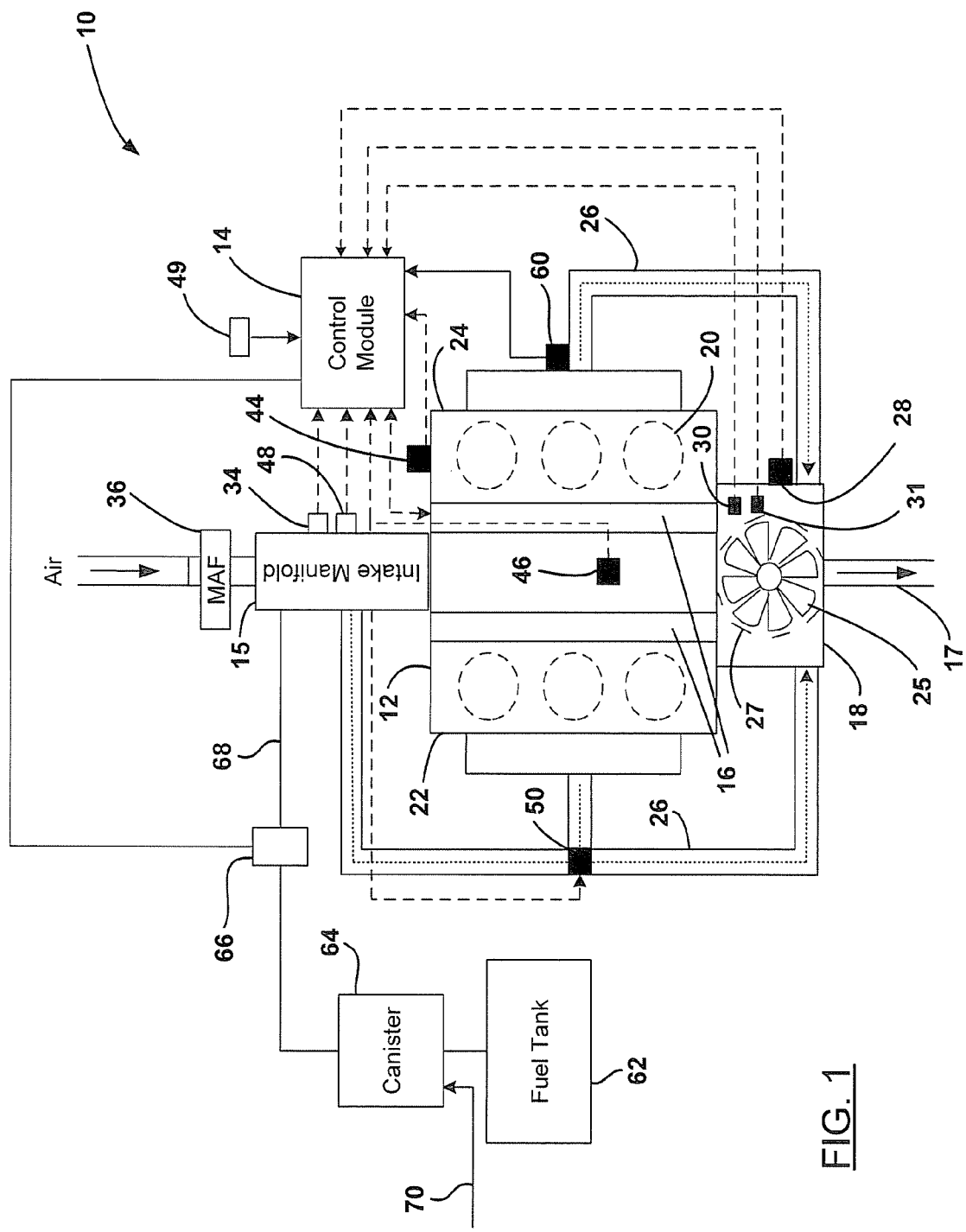
FIG. 1 is a functional block diagram of an engine and engine control system.

Referring now to FIG. 1, an exemplary engine control system 10 is schematically illustrated in accordance with the present disclosure. The engine control system 10 includes an engine 12 and a control module 14. The engine 12 includes an intake manifold 15, a fuel injection system 16 having fuel injectors and an exhaust system 17. The system 10 may also include a turbocharger 18. The exemplary engine 12 includes six cylinders 20 configured in adjacent cylinder banks 22, 24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration. While a gasoline powered internal combustion engine utilizing direct injection is contemplated, the disclosure may also apply to port fuel (indirect) injection, diesel or alternative fuel sources.

During engine operation, air is drawn into the intake manifold 15 by the inlet vacuum created by the engine intake stroke. Air is drawn into the individual cylinders 20 from the intake manifold 15 and is compressed therein. Fuel is injected by the injection system 16. The air/fuel mixture is compressed and the heat of compression and/or electrical energy ignites the air/fuel mixture. Exhaust gas is exhausted from the cylinders 20 through exhaust conduits 26. The exhaust gas drives the turbine blades 25 of the turbocharger 18 which in turn drives compressor blades 25. The compressor blades 25 can deliver additional air (boost) to the intake manifold 15 and into the cylinders 20 for combustion.

The turbocharger 18 can be any suitable turbocharger such as, but not limited to, a variable nozzle turbocharger (VNT). The turbocharger 18 can include a plurality of variable position vanes 27 that regulate the amount of air delivered to the engine 12 based on a signal from the control module 14. More specifically, the vanes 27 are movable between a fully-open position and a fully-closed position. When the vanes 27 are in the fully-closed position, the turbocharger 18 delivers a maximum amount of air into the intake manifold 15 and consequently into the engine 12. When the vanes 27 are in the fully-open position, the turbocharger 18 delivers a minimum amount of air into the engine 12. The amount of delivered air is regulated by selectively positioning the vanes 27 between the fully-open and fully-closed positions.

The turbocharger 18 includes an electronic control vane solenoid 28 that manipulates a flow of hydraulic fluid to a vane actuator (not shown). The vane actuator controls the position of the vanes 27. A vane position sensor 30 generates a vane position signal based on the physical position of the vanes 27. A boost sensor 31 generates a boost signal based on the additional air delivered to the intake manifold 15 by the turbocharger 18. While the turbocharger implemented herein is described as a VNT, it is contemplated that other turbochargers employing different electronic control methods may be employed.

A manifold absolute pressure (MAP) sensor 34 is located on the intake manifold 15 and provides a (MAP) signal based on the pressure in the intake manifold 15. A mass air flow (MAF) sensor 36 is located within an air inlet and provides a mass air flow (MAF) signal based on the mass of air flowing into the intake manifold 15. The control module 14 uses the MAF signal to determine the A/F ratio supplied to the engine 12. An RPM sensor 44 such as a crankshaft position sensor provides an engine speed signal. An intake manifold temperature sensor 46 generates an intake air temperature signal. The control module 14 communicates an injector timing signal to the injection system 16. A vehicle speed sensor 49 generates a vehicle speed signal.

The exhaust conduits 26 can include an exhaust recirculation (EGR) valve 50. The EGR valve 50 can recirculate a portion of the exhaust. The controller 14 can control the EGR valve 50 to achieve a desired EGR rate.

The control module 14 controls overall operation of the engine system 10. More specifically, the control module 14 controls engine system operation based on various parameters including, but not limited to, driver input, stability control and the like. The control module 14 can be provided as an Engine Control Module (ECM).

The control module 14 can also regulate operation of the turbocharger 18 by regulating current to the vane solenoid 28. The control module 14 according to an embodiment of the present disclosure can communicate with the vane solenoid 28 to provide an increased flow of air (boost) into the intake manifold 15.

An exhaust gas oxygen sensor 60 may be placed within the exhaust manifold or exhaust conduit to provide a signal corresponding to the amount of oxygen in the exhaust gasses.

A fuel tank 62 may also be associated with the vehicle for providing fuel to the vehicle. An evaporative canister 64 may be in fluid communication with the fuel tank 62. The evaporative canister 64 is used to receive fuel vapors from the fuel tank and store the fuel vapors therein. A valve 66 is associated with the canister 64. The valve 66 is controlled by the control module 14 and allows the vapors to pass from the canister 64 through to the intake manifold 15 in a controlled manner. The canister 64 is used to store evaporative emissions that are normally created in the fuel system and prevent their escape to the atmosphere. The canister 64 draws in fresh air through the fresh air inlet 70 when the valve 66 is opened and the intake manifold 15 provides a vacuum. The conduit 68 allows the vapors stored within the canister 64 to be drawn to the intake manifold 15 rather than being discharged to the environment. The valve 66 may open at various running conditions such as when the coolant temperature is above a predetermined temperature. Operation of the valve 66 may also be present during a fuel adjustment system diagnostic (FASD). When the purge valve 66 is opened from a closed position (when the intrusive testing is complete), a noticeable engine speed (RPM) fluctuation may be observed due to the inaccuracy of the fueling dynamics in the purge valve open transition. That is, a variation in the long-term memory value may signal an artificially different condition such as an unusually rich condition.

Figure 2:
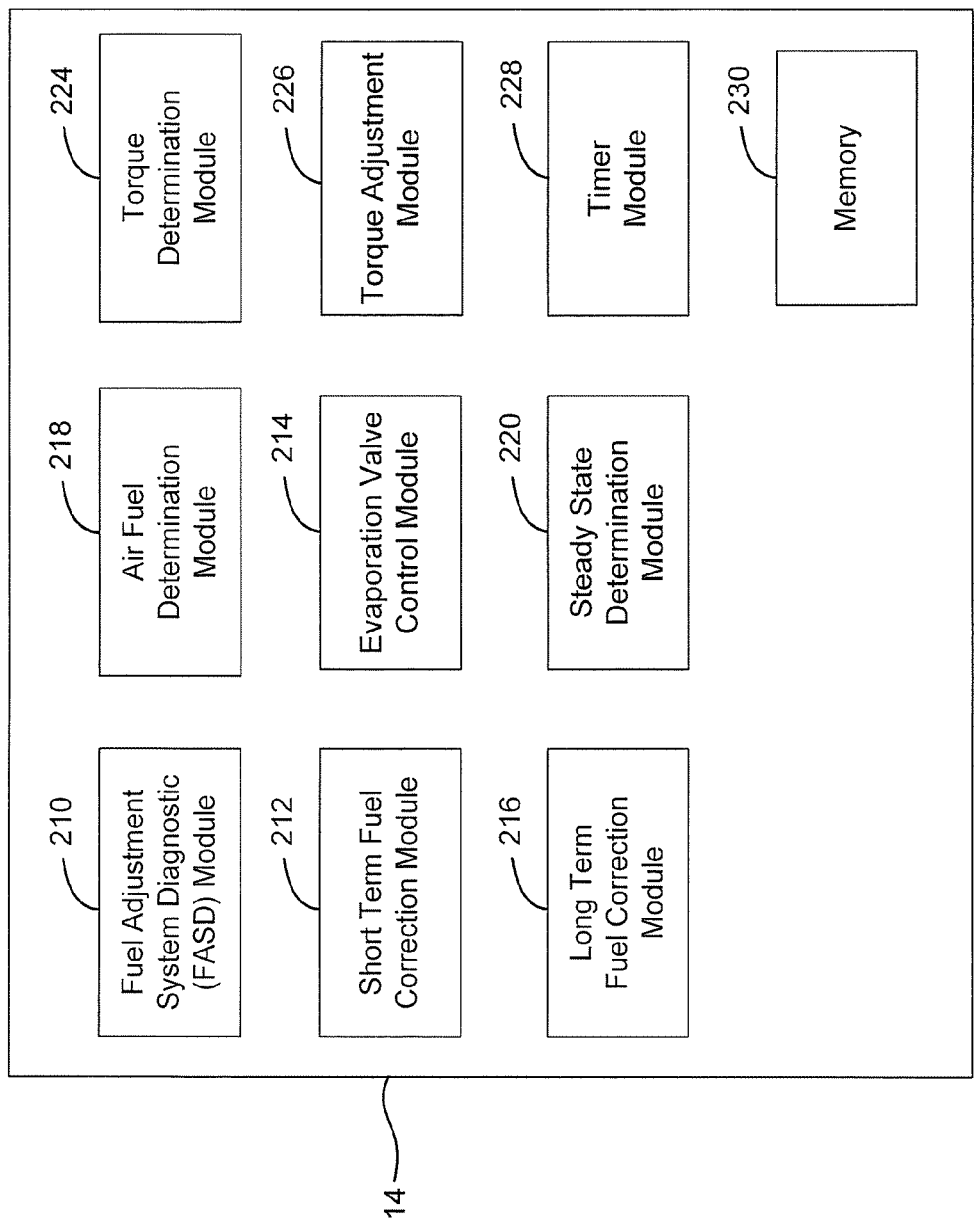
FIG. 2 is a block diagram of the control system of FIG. 1 for performing the method of the present disclosure.

Referring now to FIG. 2, a simplified block diagrammatic view of the control module 14 is illustrated. Each of the modules within the control module 14 may be interconnected. The control module 14 may include various modules therein to perform the method of the present disclosure. A fuel adjustment system diagnostic module 210 is use to perform an intrusive test such as the fuel adjustment system diagnostic. A short-term fuel correction module 212 is used to provide a short-term fuel correction signal.

An evaporation valve control module 214 is used to control an evaporation or purge valve in response to various inputs such as the fuel adjustment system diagnostic module 210.

A long-term fuel correction module 216 is used to generate a long-term fuel correction signal (LTM). The long-term correction signal changes less rapidly than the short-term value. The long-term correction signal provides an indication of rich or lean.

An air-fuel determination module 218 may be used to determine if the air-fuel ratio is rich or lean. The air-fuel determination module 218 may determine the rich or lean status.

A steady state determination module 220 is used to determine whether the engine is being operated at steady state. As will be described below, steady state may include when the crank shaft speed is steady or at a low speed, the load as determined by the manifold absolute pressure is steady or the engine is idling.

The control module 14 may also include a torque determination module 224 used to determine a torque loss from outputs of the various other modules including the FASD module 210, the short term correction module 212, the long term correction module 216, the air fuel module 218, the evaporation valve control module 214 and the steady state determination module 220.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

A torque adjustment module 226 may also be included in the control module 14. The torque adjustment module 226 may be used to adjust the torque of the engine in various ways. A maximum possible torque loss at exiting FASD (purge value is opened) will be calculated by using the maximum delta change on commanded fuel due to the changes in "fueling long term memory values" when switching from purge "off" to purge "on". The calculated maximum possible torque loss due to fueling errors can be used to issue a torque reserve request. The torque reserve can be used to increase torque quickly to offset torque loss from the fueling error. When torque reserve has been established and the purge valve opens, the engine speed can be monitored to determine if adjustments should be made with the immediate torque to offset the fueling errors. When an engine speed sag below the desired idle speed greater than a predetermined amount such as 25 rpm occurs, the engine may increase the immediate torque thereby consuming the torque reserve. This should drive the engine speed back up. If an engine speed flare above the desired idle speed greater than 25 rpm occurs, the engine may decrease the immediate torque for a predetermined time period. This should drive the engine speed back down.

A timer module 228 may be used to time various lengths of time including a time since a commanded diagnostic test was initiated or time until the diagnostic test will end. The time for an adjusted torque request may also be determined by the timer module 228. Of course, other timing determinations may also be provided.

A memory 230 may also be included in the control module 14. The memory 230 may store various data and intermediate calculations associated with the various modules 210-228. The memory 230 may be various types of memory including volatile, non-volatile, keep alive or various combinations thereof.

Figure 3:
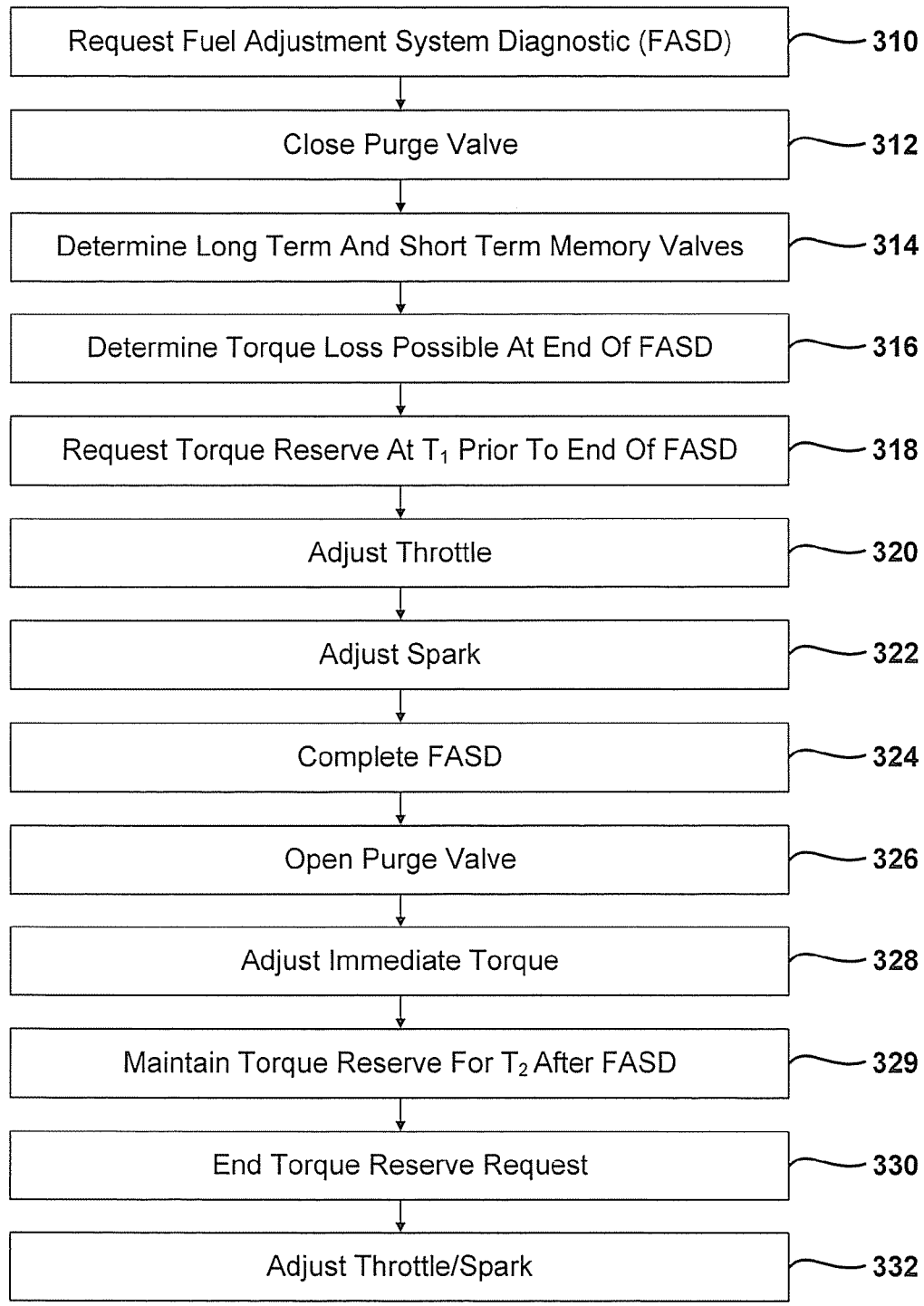
FIG. 3 is a flowchart of a method for performing the present disclosure.

Referring now to FIG. 3, a method of controlling an engine around an intrusive diagnostic procedure is set forth. In step 310, a diagnostic procedure (system diagnostic) such as a fuel adjustment system diagnostic (FASD) is performed. It should be noted that this procedure may be performed at the beginning of the diagnostic. For example, step 310 may be performed just prior to or after closing the purge valve in step 326 below. A purge valve for the evaporative canister is closed in step 312. In general, the system coordinates with the operation of the diagnostic procedure to compensate for a potential torque loss when the purge valve is open. It should be noted that the procedure may take place when a steady state driving condition is present. The steady state driving condition may be an idle speed condition or a low-speed vehicle driving condition. The present method determines an increased amount of torque but may conceivably determine a decreased amount of torque if the delta change in fuel caused by the FASD is such that a torque increase would otherwise occur. A total fuel commanded must be performed. The total fuel commanded uses the base fuel command, the long-term memory and the short-term memory correction as set forth below.

Total fuel commanded=base fuel command(Predicted air Mass/Commanded A/F)*[1+(Long term Memory correction−1)+(Total short term correction−1)].

At a steady state idle condition or low-speed driving condition, the maximum delta change of the commanded fuel is the base fuel commanded multiplied by the change in the long-term memory as set forth below.

Maximum delta change on commanded fuel=(base fuel commanded)×(delta change in the long-term memory). The delta change is from the evaporative canister purge valve "off" position to the "on" position.

A steady state may be determined by the mass airflow change rate being less than a calibration set forth below.

Definition of steady state: MAF change rate<calibration

In step 314, both the long-term and short-term memory correction values are obtained. In step 316, the torque loss possible at the end of the diagnostic is determined. The amount of fueling change described above may be input to the torque determination module 224 illustrated in FIG. 2 to determine the amount of torque reserve to obtain. The fueling change determines the amount of torque loss in the system. Step 316 determines torque loss possible at the exit of the diagnostic and step 318 requests a torque reserve that corresponds to the torque loss prior to the end of the diagnostic. The time prior to the diagnostic in which torque is built up in the system, is referred to as time $T_1$ as will be illustrated below. That is, the time $T_1$ corresponds to an amount of time that allows the torque in the engine to be built up to the torque loss level that is possible. To compensate for the torque loss, the torque reserve is requested by adjusting the throttle in step 320 and adjusting the spark in step 322. When the diagnostic is complete in step 324, the purge valve is opened in step 326. At step 328 the immediate torque is adjusted based on the engine speed deviation from the desired idle speed and the steady state commanded torque reserve is maintained for a predetermined amount of time $T_2$ after the end of the fuel adjustment system diagnostic in step 329. At the end of the fuel adjustment system diagnostic, the torque reserve request is removed in step 330 and the throttle and spark return to their normal idle levels in step 332.

Figure 4:
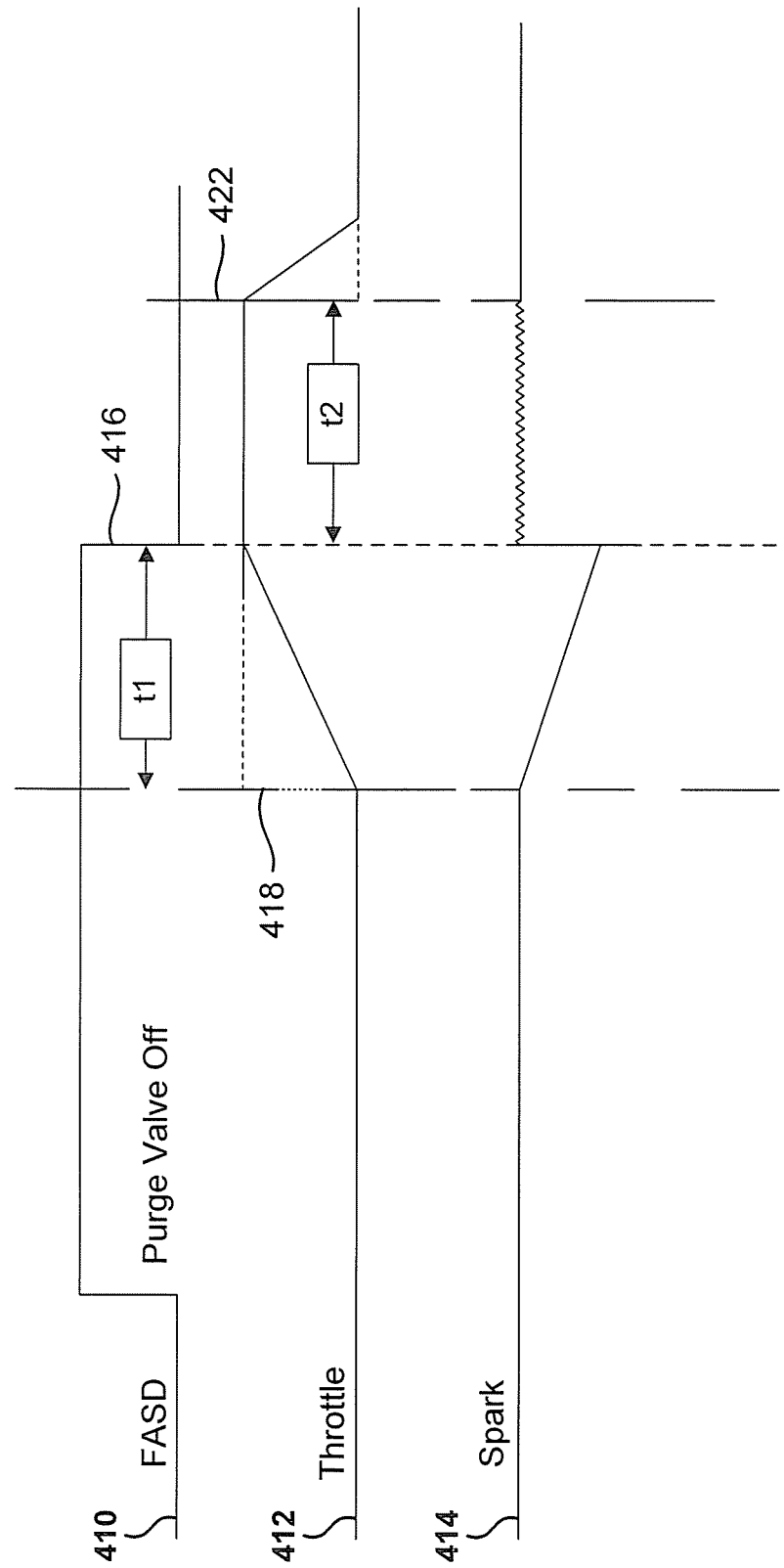
FIG. 4 is a plot of the throttle, spark and the FASD versus time.

Referring now to FIG. 4, a plot illustrating a relative timeline between the fuel adjustment system diagnostic, the throttle and the spark. The fuel adjustment system diagnostic intrusive testing on/off signal is signal 410. The throttle signal is signal 412 and the spark signal is signal 414. During the diagnostic intrusive test (purge valve in off position), because of speed fluctuations in the engine, the throttle signal 412 may be ramped up at a time $T_1$ prior to the end of the diagnostic test and before the opening of a purge valve which occurs at 416. At time 418 which corresponds to a time $T_1$ prior to time 416, the throttle signal is increased until the diagnostic test is ended and the valve is opened from a closed position. At the same time 418, the spark may be decreased until time 416. The spark decrease is necessary to maintain the same engine output torque with increased airflow due to the throttle increase. The increased throttle signal 412 reaches a maximum at time 416 and is maintained for a time $T_2$ which is long enough to prevent engine speed fluctuations. At time 416, the purge valve opens while the torque reserve is at the torque reserve level and is maintained for the time period $T_2$. During the time period $T_2$ the spark is adjusted according to the engine speed error from the fueling error. At time 422, the throttle signal is returned back to the level prior to the FASD intrusive diagnostic. Accordingly the spark returns to the same level as prior to the FASD intrusive diagnostic.

Fueling short term proportional and integral term value can be altered by multiplying scaling factors as function of (actual engine−desired engine RPM) with original fueling short term value. This is enabled when the absolute value of (actual engine RPM−desired engine RPM) is greater than a calibration value and a calibration duration after exiting FASD (purge valve "open" from "close").

A pure time delay is added before applying filtering on the close loop LTM fueling term when purge valve is "closed" to enable intrusive testing. This is also done when the purge valve is "opened" at the end of intrusive testing. During this period of time, closed loop LTM holds unchanged until filtering takes place. This is done to simulate the transport delay of changes in the purge valve before it affects the fuel in the cylinder and will help minimize fueling errors. This delay will differ between port fuel injected engines and direct injected engines.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of controlling an engine comprising:
closing a canister purge valve;
performing a system diagnostic;
determining a torque change;
creating an engine torque reserve for fueling changes for when the system diagnostic ends;
using fast engine actuators to counteract engine idle speed deviations from fueling changes when the system diagnostic ends; and
opening the purge valve.

2. A method as recited in claim 1 wherein creating the engine torque reserve comprises creating the engine torque reserve a first period before opening the purge valve.

3. A method as recited in claim 2 wherein creating the engine torque reserve comprises maintaining the engine torque reserve for a second period after opening the purge valve.

4. A method as recited in claim 3 wherein changing the engine torque comprises changing a throttle signal from a first level to a second level and after the second period changing the throttle signal from a second level to the first level.

5. A method as recited in claim 1 wherein changing the engine torque comprises changing a throttle signal from a first level to a second level.

6. A method as recited in claim 1 wherein changing the engine torque comprises changing a spark timing.

7. A method as recited in claim 1 wherein changing the engine torque comprises changing a throttle and changing a spark timing.

8. A method as recited in claim 1 wherein opening the purge valve comprises opening the purge valve after creating the engine torque reserve.

9. A method as recited in claim 1 wherein determining a maximum potential torque loss comprises determining the maximum potential torque loss based on a maximum potential change in a commanded maximum fuel level.

10. A method as recited in claim 1 wherein determining a torque change comprises determining the torque change based on a long-term memory value, a short-term memory value and an air mass.

11. A method as recited in claim 1 further comprising changing a fast engine actuator spark to adjust engine torque to counteract the engine speed deviation to consuming the torque reserve.

12. A method as recited in claim 11 wherein performing the system diagnostic is performed prior to determining a torque loss change, and wherein opening the purge valve comprises opening the purge valve at the end of the system diagnostic.

13. A method of controlling an engine comprising:
closing a canister purge valve during a system diagnostic;
performing the system diagnostic;
determining a maximum possible torque loss due to a fueling change when the system diagnostic ends and the canister purge valve is opened;
creating a torque reserve by opening a throttle and retarding spark at a predetermined first period prior to opening a purge valve;
thereafter, opening the purge valve and ending the system diagnostic;
adjusting engine torque with spark based on engine speed deviations from idle utilizing the torque reserve; and
maintaining the torque reserve a second predetermined period after opening the purge valve and ending the system diagnostic.

14. A method as recited in claim 13 wherein creating the torque reserve comprises changing a throttle signal from a first level to a second level.

15. A method as recited in claim 13 further comprising prior to opening the purge valve, waiting a predetermined time corresponding to an air transport delay.

16. A control module for an engine comprising:
an evaporation control valve module closing a canister purge valve during a system diagnostic;
a torque determination module determining a torque change and generating a torque reserve for fueling changes for when the system diagnostic ends; and
a torque adjustment module that controls fast engine actuators to counteract engine idle speed deviations from fueling changes when the system diagnostic ends,
said evaporation control valve module opening the purge valve at an end of the diagnostic.

17. A system as recited in claim 16 wherein the torque adjustment module creates the torque reserve a first period before opening the purge valve.

18. A system as recited in claim 17 wherein the torque adjustment module creates the torque reserve for a second period after opening the purge valve.

19. A system as recited in claim 18 wherein the torque adjustment module changes an engine torque from a first level to a second level and after a second period changes a throttle signal from a second level to the first level.

20. A system as recited in claim 16 wherein the torque adjustment module changes an engine torque by changing a throttle signal.

21. A system as recited in claim 16 wherein the torque adjustment module changes an engine torque by changing a spark timing.

* * * * *